United States Patent [19]

Nakayama et al.

[11] Patent Number: 4,743,152
[45] Date of Patent: May 10, 1988

[54] SCREW GROMMET

[75] Inventors: Hiromichi Nakayama, Nagoya; Kunihiro Fukuhara, Toyota, both of Japan

[73] Assignee: Nifco Inc., Yokohama, Japan

[21] Appl. No.: 15,559

[22] Filed: Feb. 13, 1987

Related U.S. Application Data

[63] Continuation of Ser. No. 772,311, Sep. 4, 1985, abandoned.

[30] Foreign Application Priority Data

Sep. 7, 1984 [JP] Japan .......................... 59-136062[U]

[51] Int. Cl.⁴ ............................................. F16B 37/04
[52] U.S. Cl. ................................... 411/182; 411/508; 411/913
[58] Field of Search ................. 411/15, 57, 60–62, 411/71–74, 182, 508–510, 913; 24/297, 681

[56] References Cited

U.S. PATENT DOCUMENTS

| | | | |
|---|---|---|---|
| 3,383,976 | 5/1968 | Schenkel | 411/62 |
| 3,703,120 | 11/1972 | Van Buren, Jr. | 411/60 |
| 3,756,116 | 9/1973 | Schuplin | 411/182 |
| 4,070,945 | 1/1978 | Kurosaki | 411/182 |
| 4,263,833 | 4/1981 | Loudin et al. | 411/60 |
| 4,322,194 | 3/1982 | Einhorn | 411/57 |

FOREIGN PATENT DOCUMENTS

| | | | |
|---|---|---|---|
| 1500988 | 11/1969 | Fed. Rep. of Germany | 411/72 |
| 2129218 | 12/1971 | Fed. Rep. of Germany | 411/72 |
| 2143005 | 3/1973 | Fed. Rep. of Germany | 411/73 |
| 2813749 | 10/1978 | Fed. Rep. of Germany | 411/182 |
| 481314 | 12/1969 | Switzerland | 411/72 |
| 1139976 | 1/1969 | United Kingdom | 411/60 |

Primary Examiner—Neill Wilson
Attorney, Agent, or Firm—Trexler, Bushnell, Giangiorgi & Blackstone, Ltd.

[57] ABSTRACT

A screw grommet has a flange and a leg extending therefrom and has cantilever-like engagement projections extending tangentially with respect to the outer periphery of the leg. A panel can be held clamped between the flange and engagement projections. When inserting the leg through an opening in the panel, the engagement projections are easily flexed to facilitate the insertion.

5 Claims, 1 Drawing Sheet

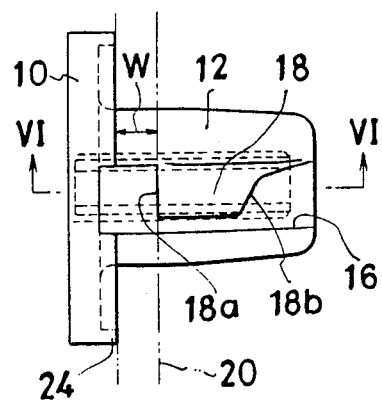
FIG_1
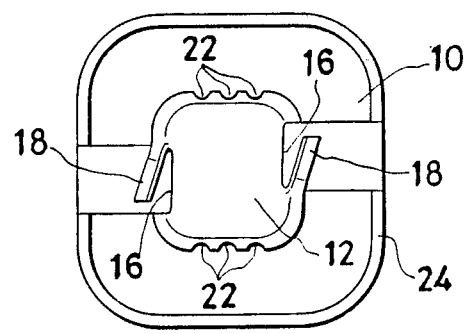
FIG_2
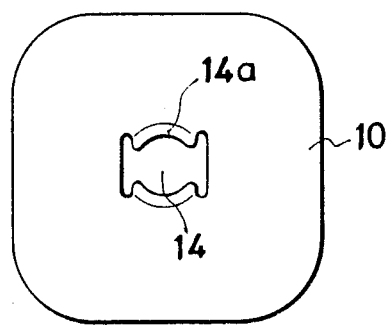
FIG_3
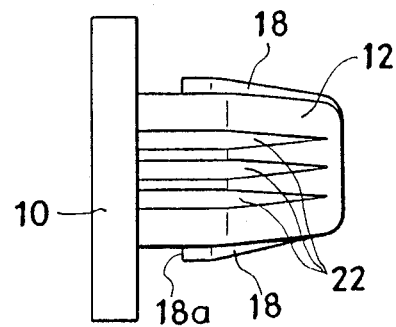
FIG_4
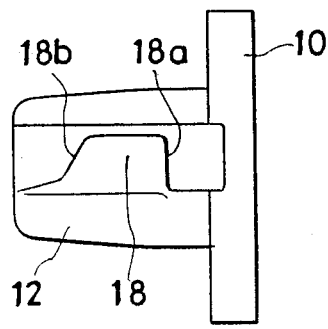
FIG_5
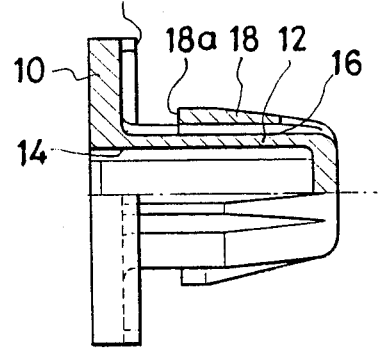
FIG_6

SCREW GROMMET

This application is a continuation of application Ser. No. 772,311 filed Sept. 4, 1985, now abandoned.

FIELD OF THE INVENTION AND RELATED ART STATEMENT

This invention relates to a screw grommet for securing a plurality of panels in a slightly spaced-apart relation to one another.

A screw grommet has a flange and a leg extending therefrom. The leg is provided with engagement projections radially extending from an intermediate portion. When the screw grommet is inserted through an opening in a panel, the engagement projections engage the edge of the opening from the back side of the panel, thus preventing detachment of the screw grommet. A tapping screw is screwed into the screw grommet, and another panel is mounted on the tapping screw.

A screw grommet having the above structure is disclosed in U.S. Pat. No. 4,077,300. In this screw grommet, the leg has integral, radially projecting engagement projections, which contract the tapping screw receiving bore when the leg is forcibly inserted through the panel opening. When the leg has been inserted, the initial shape of the leg recovers elastically so that the engagement projections engage with the back side of the panel.

With the prior art screw grommet, therefore, the height of the engagement projections and rigidity of the leg must be increased to increase the mechanical strength of the engagement with the panel. In this case, an increased force is required for inserting the leg through the panel opening, thus reducing the operability. To reduce the necessary inserting force, the force of engagement of the engagement projections with the panel has to be reduced. In this case, occasional rotation of the screw grommet in the panel opening at the time of screwing the tapping screw or detachment of the screw grommet from the panel is liable to result.

There is another type of screw grommet in use, in which the leg has cantilever-like engagement projections extending from the outer periphery substantially in the axial direction toward the flange. In this case, it is possible to reduce the inserting force and increase the force of engagement with the panel by virtue of the elasticity of the cantilever-like engagement projections. In this case, however, the molding die for molding the screw grommet has a complicated shape. In addition, the gap between the end of the engagement projections and flange is unstable, leading to vibration of the screw grommet with respect to the panel or defective mounting of the panel. Further, since the back side of the panel is supported by the ends of the cantilever-like engagement projections, the urging force is liable to be insufficient.

OBJECT AND SUMMARY OF THE INVENTION

An object of the invention is to provide a screw grommet, which can be simply produced, requires low insertion force when mounting it in a panel and which can ensure reliable engagement.

To attain the above object of the invention, there is provided a screw grommet having a flange and a leg extending therefrom, a screw receiving bore being formed along the axis of the flange and leg, the leg having cantilever-like engagement projections extending tangentially from the outer periphery of the leg.

Since the cantilever-like engagement projections project tangentially from the leg, the panel can be clamped between the flange and the side surface of the engagement projections. When the screw grommet is inserted through the panel opening, the engagement projections are readily flexed to reduce the inserting force. Also, when the screw grommet has been inserted, the side surface of the engagement projections facing the flange engage with the panel, so that the mechanical strength of the engagement can be increased. Further, since the screw grommet has a simple configuration, the plastic molding die for producing it may have a simple shape and can be readily prepared.

The above and other objects and features of the invention will become more apparent from the detailed description thereof made with reference to the accompanying drawings.

BRIEF EXPLANATION OF THE DRAWINGS

FIG. 1 is a front view showing an embodiment of the screw grommet according to the invention;

FIG. 2 is a right side view of the screw grommet shown in FIG. 1;

FIG. 3 is a left side view showing the screw grommet shown in FIG. 1;

FIG. 4 is a plan view showing the screw grommet shown in FIG. 1;

FIG. 5 is a back view showing the screw grommet shown in FIG. 1; and

FIG. 6 is a bottom view with respect to FIG. 1 with a partial section taken along line VI—VI in FIG. 1.

DESCRIPTION OF THE PREFERRED EMBODIMENT

The present invention relates to a screw grommet for securing at least two panels in position with a slight gap formed between adjacent panels. An embodiment of the screw grommet is shown in FIGS. 1 to 6. The illustrated screw grommet is a one-piece molding of a synthetic resin having a flange 10 and a leg 12 projecting therefrom.

The leg 12 is substantially rectangular in cross section as shown in FIG. 2.

The flange 10 has a screw receiving bore 14 formed to a predetermined depth from its side opposite the leg 12. The screw receiving bore 14, as shown in FIG. 3, is substantially H-shaped when viewed in the axial direction. The bore 14 has a central, outwardly convex arcuate portion 14a, into which a tapping screw is screwed. When the tapping screw is screwed in, a female thread is formed, and also the tapping screw is firmly screwed in the leg 12.

As shown in FIG. 2, the leg 12 has axially elongate notches 16 formed in diametrically opposite portions. An engagement projection 18 is provided like a cantilever arm from one side wall of each notch 16 such that it extends slightly outwardly in a tangential direction with respect to the outer periphery of the leg 12.

The engagement projection 18, as shown in FIG. 1, has an end 18a on the side of and substantially parallel to the flange 10 such that a panel 20 is clamped between the flange 10 and engagement projections 18. The end 18b of the engagement projection 18 opposite the end 18a is inclined toward the free end of the leg 12, thus reducing the force necessary for inserting the leg 12 into an opening of the panel 20.

The outer surface of the leg 12 other than the surface formed with the engagement projections 18 is formed with axial grooves 22 having an arcuate sectional profile. The grooves 22 have an effect of reducing the frictional resistance when the leg is inserted through the panel opening.

The flange 10 has a rib 24 extending from the edge on the side of the leg 12. The rib 24 is urged against the panel 20 on the side opposite the engagement projections 18 to elastically urge the panel 20.

The embodiment of the screw grommet having the above construction can be produced by moving the leg 12 in the axial direction (i.e., to the left or right in FIG. 1) at the time of molding. The molding die thus can be readily produced. The screw grommet can be mounted in the panel 20 by forcibly inserting the leg 12 through the opening of the panel 20 with the flange 10 pushed by a finger or the like. At this time, the end portion of each engagement projection 18, which extends like a cantilever from the outer periphery of the leg 12, is flexed into the associated notch 16, so that the leg 12 can be readily inserted through the rectangular mounting opening formed in the panel 20. The rectangular panel hole thus may have a size such that the outer shape of the leg 12 other than the engagement projections 18 can snugly fit in it. Further, the corners of the leg 12 may have a sufficiently large thickness to prevent rotation of the leg 12 after it has been inserted in the panel opening.

Therefore, when screwing a tapping screw into the screw receiving bore 14 from the side of the flange 10 for mounting another panel on the flange 10, the reaction force against the turning of the screw grommet by the screwing in of the tapping screw can be reliably supported.

After the panel 20 has been secured, the panel 20 is held tightly clamped between the end 18a of each engagement projection 18 and flange 10, thus eliminating vibration with respect to the panel 20. In order to permit the panel 20 to be readily clamped between each end 18a and flange 10, the end surface may be slightly inclined outwardly toward the end of the leg 12.

With the above embodiment, it is possible to maintain the dimension "W" between the end 18a and flange 10 accurately. That is, the dimension "W" between the engagement projection 18 and flange 10 can be maintained more accurately compared with the case where the cantilever engagement projection 18 is formed such that they extend from the leg 12 substantially in the axial direction toward the flange 10. Not the end surface of the cantilever-like engagement projection 18 but the side surface thereof engages the back side of the panel 20. Therefore, sufficient mechanical strength of the engagement with the panel 20 can be ensured, and great resistance against the force tending to detach the screw grommet can be produced. Further, where all the four sides of the leg 12 are provided with engagement projections 18, there is no need of preparing a complicated molding die.

As has been described in the foregoing, with the screw grommet according to the invention the engagement projections extending in cantilever form substantially in a tangential direction from the outer periphery of the leg are adapted to engage with the back surface of the mounting panel. Thus, the screw grommet can be readily inserted through the panel opening with elastic deformation of the engagement projections. The leg can tightly clamp the panel and reliably resist the turning force of the tapping screw after the screw grommet has been inserted in the panel opening. Besides, the ends of the engagement projections can reliably prevent detachment of the leg.

What is claimed is:

1. A one-piece screw grommet of plastic resin construction comprising a transverse flange and a noncircular leg extending from said flange for insertion in a complementary aperture in a panel, said flange and said leg having a screw-receiving bore along the axis of said leg, said leg having a plurality of integral flange-like projections each joined thereto along a line substantially parallel to the axis of said leg and cantilevered tangentially outwardly therefrom and having an outer edge substantially parallel to said line, said leg having relieved areas beneath said projections, said projections folding into said relieved areas upon insertion of said leg through a complementary aperture in a panel and thereafter springing out into projecting position beneath said panel, each said projectoin having a tapering entering end to effect such folding, said tapering entering end having first a shallow taper followed by a steeper taper and each said projection having a trailing end substantially perpendicular to said axis and spaced from said flange to grip a panel between said projection and said flange, the outer surface of said leg being formed with axial grooves having an arcuate sectional profile.

2. The screw grommet according to claim 1, wherein said flagne has a rib extending from the edge on the side of said leg.

3. A one-piece screw grommet of plastic resin construction comprising a transverse flange and a noncircular leg extending from said flange for insertion in a complementary aperture in a panel, said flange and said leg having a screw-receiving bore along the axis of said leg, said leg having a plurality of integral flange-like projections each joined thereto throughout its length along a line substantially parallel to the axis of said leg and each of said projections being cantilevered tangentially outwardly therefrom and having an outer edge substantially parallel to said line, said leg having relieved areas beneath said projections, said projections folding into said relieved areas upon insertion of said leg through a complementary aperture in a panel and thereafter springing out into projecting position beneath said panel, each said projection having a tapering entering end to effect such folding, said tapering entering end having first a shallow taper substantially straight edge followed by a steeper taper substantially straight edge and each said projection having a substantially straight trailing end substantially perpendicular to said axis and spaced from said flange to grip a panel between said projection and said flange.

4. The screw grommet according to claim 3, wherein said leg has substantially rectangular sectional profile.

5. The screw grommet according to claim 3, wherein said screw receiving bore has a substantially H-shaped sectional profile.

* * * * *